United States Patent
Huang et al.

(10) Patent No.: US 10,826,363 B2
(45) Date of Patent: Nov. 3, 2020

(54) ADDITIVELY MANUFACTURED ASSEMBLIES FOR ELECTRICAL MACHINES

(71) Applicant: GE Aviation Systems LLC, Grand Rapids, MI (US)

(72) Inventors: Hao Huang, Troy, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 212 days.

(21) Appl. No.: 15/976,014

(22) Filed: May 10, 2018

(65) Prior Publication Data

US 2019/0348894 A1 Nov. 14, 2019

(51) Int. Cl.
*H02K 1/12* (2006.01)
*H02K 15/02* (2006.01)
(Continued)

(52) U.S. Cl.
CPC ........... *H02K 15/024* (2013.01); *B29C 64/10* (2017.08); *H02K 1/165* (2013.01); *H02K 1/32* (2013.01); *H02K 15/0407* (2013.01); *H02K 15/065* (2013.01); *B33Y 10/00* (2014.12); *B33Y 30/00* (2014.12)

(58) Field of Classification Search
CPC ......... Y10T 29/49012; Y10T 29/49009; Y10T 29/49071; Y10T 29/49073; Y10T 29/49075; B29C 64/10; B33Y 10/00; B33Y 30/00; H02K 15/024; H02K 15/026; H02K 15/0407; H02K 15/065; H02K 1/223
See application file for complete search history.

(56) References Cited

U.S. PATENT DOCUMENTS 2,411,002 A 11/1946 Rudenberg
5,189,325 A 2/1993 Jarczynski
(Continued)

FOREIGN PATENT DOCUMENTS

DE 9003390 U1 6/1990
DE 102011121793 A1 6/2013
(Continued)

OTHER PUBLICATIONS

U.S. Appl. No. 15/671,321, filed Aug. 8, 2017.
(Continued)

*Primary Examiner* — Thanh Lam
(74) *Attorney, Agent, or Firm* — Dority & Manning, P.A.

(57) ABSTRACT

Electrical machines, components thereof, and methods for manufacturing the same are provided. In one aspect, methods for additively manufacturing a rotor assembly for an electrical machine is provided. The method includes additively printing the rotor core and shaft of the same material composition. In another aspect, an electrical machine is provided. The electrical machine includes a stator assembly that includes a stator core having a plurality of poles with magnetic slot wedges positioned between adjacent poles to reduce tooth harmonics. The electrical machine also includes a rotor assembly having a rotor core that is formed as a solid core. In yet another aspect, a rotor assembly for an electrical machine is provided that includes slots that reduce eddy current losses in the rotor core during operation of the electrical machine.

8 Claims, 15 Drawing Sheets

(51) Int. Cl.
*B29C 64/10* (2017.01)
*H02K 1/16* (2006.01)
*H02K 1/32* (2006.01)
*H02K 15/04* (2006.01)
*H02K 15/06* (2006.01)
*B33Y 10/00* (2015.01)
*B33Y 30/00* (2015.01)

(56) References Cited

U.S. PATENT DOCUMENTS

| | | | |
|---|---|---|---|
| 6,159,305 | A | 12/2000 | Kliman et al. |
| 6,700,295 | B2* | 3/2004 | Kanno ............... H02K 1/24 29/598 |
| 7,687,928 | B2 | 3/2010 | Taneja et al. |
| 8,232,702 | B2 | 7/2012 | Zywot et al. |
| 8,671,552 | B2* | 3/2014 | Bray ............... H02K 1/22 29/598 |
| 8,787,651 | B2 | 7/2014 | Potts et al. |
| 9,252,642 | B2 | 2/2016 | Buttner et al. |
| 9,419,502 | B2 | 8/2016 | Veronesi et al. |
| 9,698,635 | B2 | 7/2017 | Kuehn et al. |
| 9,837,868 | B2* | 12/2017 | Wirsch, Jr. .......... H02K 3/24 |
| 10,476,358 | B2* | 11/2019 | Huang ............... H02K 1/02 |
| 2003/0030333 | A1 | 2/2003 | Johnsen |
| 2011/0080068 | A1* | 4/2011 | Dawson ........... H02K 15/0006 310/216.114 |
| 2012/0126643 | A1 | 5/2012 | Zhong |
| 2013/0207395 | A1 | 8/2013 | Huang et al. |
| 2014/0035423 | A1 | 2/2014 | Veronesi et al. |
| 2015/0022035 | A1 | 1/2015 | Yamada et al. |
| 2015/0061441 | A1* | 3/2015 | Figgins ............. H02K 1/2773 310/156.01 |
| 2016/0053858 | A1 | 2/2016 | Brassitos et al. |
| 2016/0149451 | A1 | 5/2016 | Teter et al. |
| 2016/0204663 | A1 | 7/2016 | Huang et al. |
| 2016/0285332 | A1 | 9/2016 | Huang et al. |
| 2016/0352174 | A1 | 12/2016 | Huang et al. |
| 2017/0063183 | A1 | 3/2017 | Shrestha et al. |
| 2017/0234161 | A1 | 8/2017 | Bunker |
| 2018/0233977 | A1 | 8/2018 | Volkmuth et al. |
| 2019/0214179 | A1 | 7/2019 | Pyrhonen et al. |

FOREIGN PATENT DOCUMENTS

| | | |
|---|---|---|
| DE | 102014223330 A1 | 5/2016 |
| EP | 0415057 A1 | 3/1991 |
| EP | 3044851 | 7/2016 |
| EP | 3065267 A1 | 9/2016 |
| EP | 3131189 A1 | 2/2017 |
| WO | WO2015/034514 A1 | 3/2015 |
| WO | WO2015/034544 A2 | 3/2015 |
| WO | WO2015/034545 A2 | 3/2015 |
| WO | WO2018/037159 A1 | 3/2018 |

OTHER PUBLICATIONS

U.S. Appl. No. 15/671,298, filed Aug. 8, 2017.
U.S. Appl. No. 15/671,336, filed Aug. 8, 2017.
U.S. Appl. No. 15/671,344, filed Aug. 8, 2017.
U.S. Appl. No. 15/671,358, filed Aug. 8, 2017.
European Search Report Corresponding to Application No. 19172378 dated Oct. 15, 2019.
Lammers et al, "Additive Manufacturing of a lightweight rotor for a permanent magnet synchronous maching", 2016 6th International Electric Drives Production Conference (EDPC), IEEE, Nov. 30, 2016, pp. 41-45.

* cited by examiner

ADDITIVELY MANUFACTURED ASSEMBLIES FOR ELECTRICAL MACHINES

FIELD

The present subject matter relates generally to additively manufactured components, and more particularly, to electrical machinery and methods for additively manufacturing assemblies for electrical machines.

BACKGROUND

Electrical machinery, such as generators, motors, motor/generators, starter/generators, and other electrical machinery can be used for a variety of purposes. An electrical machine can include a stator and a rotor. The rotor can be rotated relative to the stator to generate electrical energy and/or can be rotated relative to the stator as a result of changing magnetic fields induced in windings of the stator.

Conventional methods of manufacturing an electrical machine or components therefore can include, for instance, punching, stamping, or cutting laminations to shape, stacking the oxidized laminations to form a core, winding coils made of insulated wire, inserting slot liners and coils into slots of the core, sliding slot wedges at the top of a slot, forming end turns, shrinking/fitting the core onto a pre-machined shaft, and then performing final machining. While such methods may be used to form satisfactory electric machines and components therefore, such methods may be technically complex, inefficient, and costly.

Therefore, improved methods for manufacturing electric machines that address one or more of the challenges noted above would be useful.

BRIEF DESCRIPTION

Aspects and advantages of embodiments of the present disclosure will be set forth in part in the following description, or may be learned from the description, or may be learned through practice of the embodiments.

In one example embodiment, a method for manufacturing a rotor assembly for an electrical machine is provided. The method includes printing, by a three-dimensional (3D) printing process, a first part of a rotor shaft. The method also includes printing, by a three-dimensional (3D) printing process, a first part of a rotor shaft. Further, the method includes printing, by the 3D printing process, a rotor core extending between a first end and a second end and having a core body and a core portion of the rotor shaft formed unitarily with the core body, the core portion of the rotor shaft extending between the first end and the second end of the rotor core, wherein the rotor core is printed as a solid core. Moreover, the method includes printing, by the 3D printing process, a second part of the rotor shaft, wherein the second part of the rotor shaft is connected to the core portion of the rotor shaft at the second end of the rotor core and the first part of the rotor shaft is connected to the core portion of the rotor shaft at the first end of the rotor core. The method also includes coupling a rotor winding to the rotor core to form the rotor assembly.

In such implementations, the first part of the rotor shaft, the rotor core, and the rotor second part of the rotor shaft may be printed in any suitable order. For instance, in some implementations, the first part of the rotor shaft is printed, the rotor core is printed onto the first part of the rotor shaft, and the second part of the rotor shaft is then printed onto the opposite end of the rotor core. In this way, the rotor assembly may be printed in a single print. In some implementations, the rotor core is printed first, and the first and second parts of the rotor shaft are printed to the first end and the opposing second end of the rotor core respectively. Other suitable orders of printing the rotor assembly are possible.

In another example embodiment, an electrical machine is provided. The electrical machine includes a stator assembly. The stator assembly includes a stator core comprising a core body and a plurality of poles each having a first end integrally formed with the core body and an opposing second end. The stator core also includes a plurality of slot wedges formed of a magnetic material, wherein each of the plurality of slot wedges is disposed between adjacent poles of the plurality of poles adjacent their second ends to define a space between the slot wedge and the core body. Further, the stator core also includes a winding assembly comprised of a plurality of windings, each of the plurality of windings disposed within a corresponding one of the spaces between the slot wedge and the core body. The electrical machine also includes a rotor assembly comprising a rotor core spaced from the stator core to define an airgap therebetween, wherein the rotor core is a solid core.

In yet another example embodiment, a rotor assembly for an electrical machine is provided. The rotor assembly defines an axial direction, a radial direction, and a circumferential direction. The rotor assembly includes a rotor core having a core body and a plurality of poles projecting from the core body along the radial direction, each of the plurality of poles having a peripheral surface, and wherein the peripheral surface of at least one of the plurality of poles defines a slot extending in a direction substantially orthogonal to the axial direction.

In some embodiments, the electric machines and assemblies described herein may be incorporated into aerial vehicles and/or used in conjunction with a gas turbine engine, e.g., as a hybrid electric system for an aerial vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
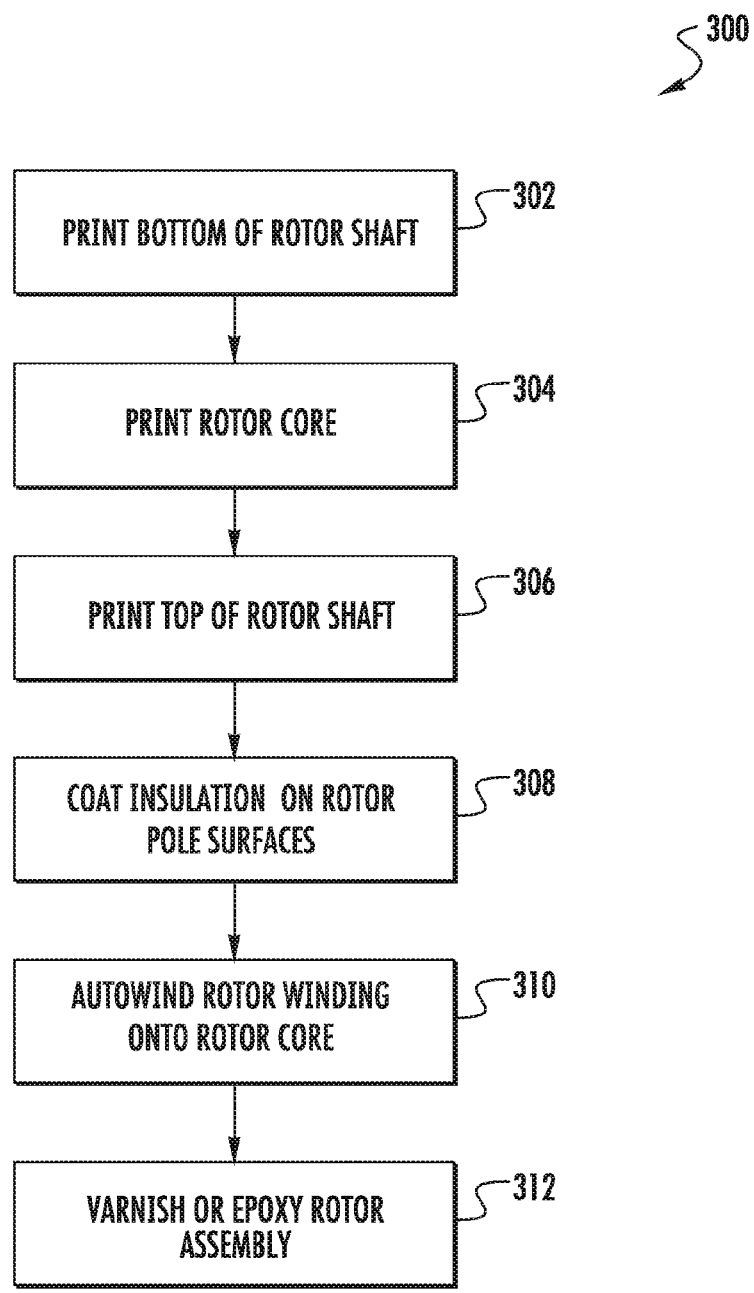
FIG. 1 depicts an example flow diagram of manufacturing a rotor assembly according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount. The use of the term "substantially" in conjunction with a direction refers to within 25° of the stated direction. As used herein, "unitary" is used to denote that a particular thing or component is formed of a single piece.

Example aspects of the present disclosure are directed to additively manufactured or "printed" components of electrical machinery (e.g., rotary electrical machines) and/or to methods for manufacturing the same. In accordance with aspects of the present disclosure, the example electrical machines and components thereof described herein may be formed using an additive-manufacturing process, such as a 3-D printing process. The use of such a process may allow the electrical machines and components thereof described herein to be formed integrally, as a single unitary component, or as any suitable number of sub-components. In particular, the manufacturing process may allow the electrical machines and components thereof to be integrally formed and include a variety of features not possible when using prior manufacturing methods. For example, the additive manufacturing methods described herein enable the manufacture of the rotor shaft and the rotor core as a unitary component or piece. Further, such additive manufacturing methods allow for a homogeneous rotor core and shaft. That is, the rotor core and shaft may be formed of the same material composition, such as a cobalt iron (e.g., HIP-ERCO50), silicon iron (e.g., M19, M36, etc.). As another example, the additive manufacturing methods described herein enable the manufacture of a stator core assembly having a solid core or unitary core. Magnetic slot wedges may be positioned between the poles of the core to hold windings within the slots between the poles. The magnetic wedges may reduce the tooth harmonics, thereby providing improved efficiency of an electrical machine during operation. As yet another example, the additive manufacturing methods described herein enable the manufacture of a rotor assembly having a rotor core that is printed such that a plurality of cooling openings and cooling tubes are defined by the core proximate the rotor slots defined between the poles or teeth of the rotor. The cooling openings may provide improved cooling. Further, a rotor assembly having a rotor core may include slots defined by peripheral surfaces of the poles of the rotor core. Such slots may also reduce tooth harmonics. These novel features are described herein.

The components described above can be assembled together to form an electrical machine. Example electrical machines that can be assembled according to example embodiments of the present disclosure can include generators, motors, motor/generators, starter/generators, etc. In some embodiments, the electrical machine can be air cooled. In some embodiments, the electrical machine can be liquid cooled. In some embodiments, the electrical machine can be a wet cavity machine, a dry cavity machine, and/or wet/dry combination.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a unitary component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral inlet and outlet manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability. Example manufacturing processes for printing components of an electrical machine will be discussed in detail below.

FIG. 1 depicts a flow diagram of an example method (300) for printing a rotor assembly of an electrical machine according to example embodiments of the present disclosure. FIG. 1 depicts steps performed in a particular order for purposes of illustration and discussion. Those of ordinary skill in the art, using the disclosures provided herein, will understand that the steps of any of the methods disclosed herein can be adapted, expanded, include sub-steps, modified, omitted, performed simultaneously, and/or rearranged in various ways without deviating from the scope of the present disclosure.

Figure 2:
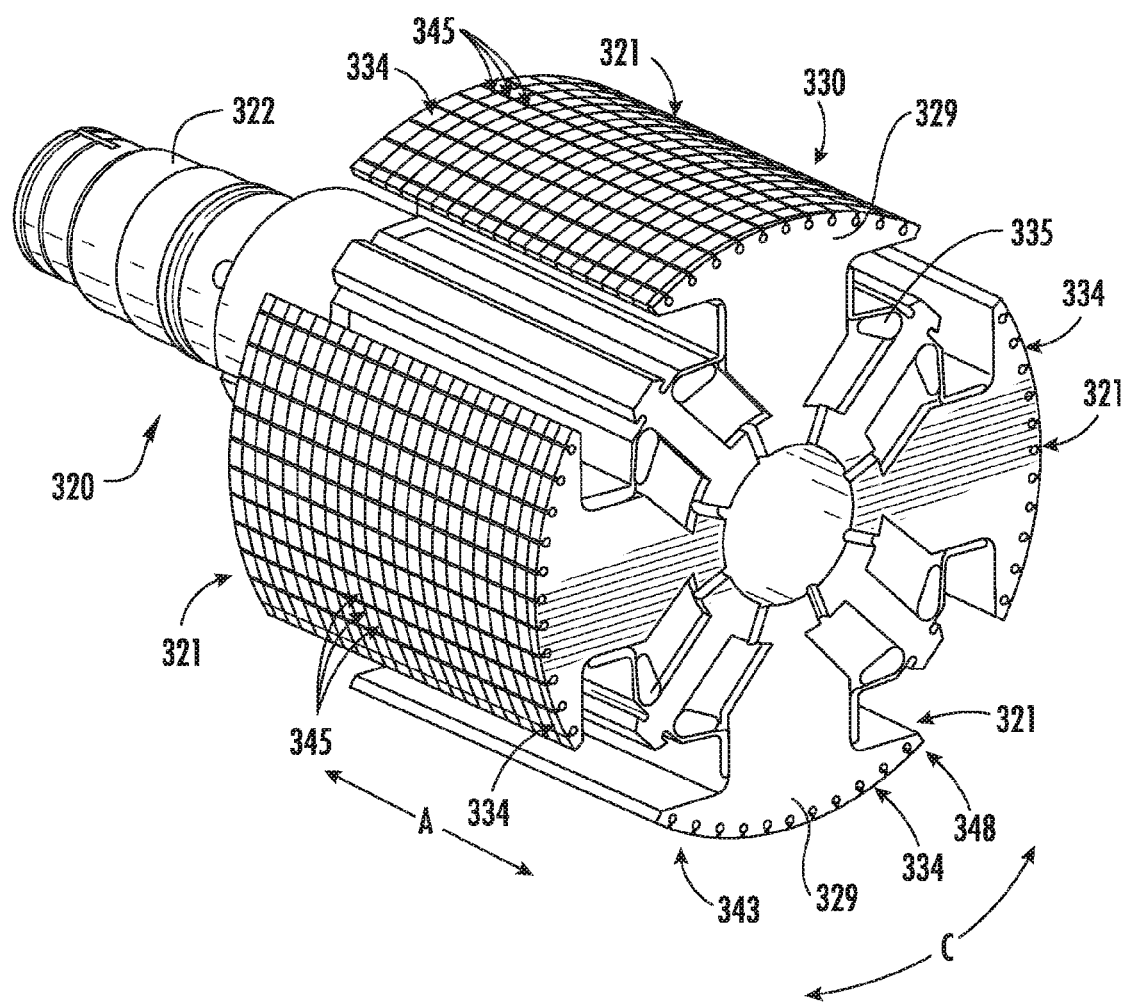
FIG. 2 depicts a rotor core and a first portion of a rotor shaft printed according to example embodiments of the present disclosure.

At (302), the method (300) includes printing a first or bottom portion of a rotor shaft layer by layer until it reaches a desired height. FIG. 2 depicts a first portion 322 of a rotor shaft 320 printed according to example embodiments of the present disclosure. The first portion 322 of the rotor shaft 320 can be printed of any suitable material. For example, in some embodiments, the first portion 322 of the rotor shaft 320 can be printed of a steel alloy, such as a #4340 steel alloy containing, for instance, nickel, chromium, and/or molybdenum. Other suitable materials can be used without deviating from the scope of the present disclosure.

At (304), with reference again to FIG. 1, the method (300) includes printing a rotor core. For exemplary method (300), the rotor core is printed as a solid core, layer by layer by a 3D printing process. That is, the rotor core is formed as a unitary component. Moreover, desired features of the rotor core can be printed utilizing the 3D printing process. For instance, features associated with one or more cooling tubes for the rotor core can be printed and/or features associated with one or more cooling openings can be printed. Other features that may be printed utilizing the 3D printing process may include slots defined by a peripheral surface of one or more poles of the rotor core. In some embodiments, a shaft section for the rotor shaft passing through the rotor core can be printed.

Figure 3:
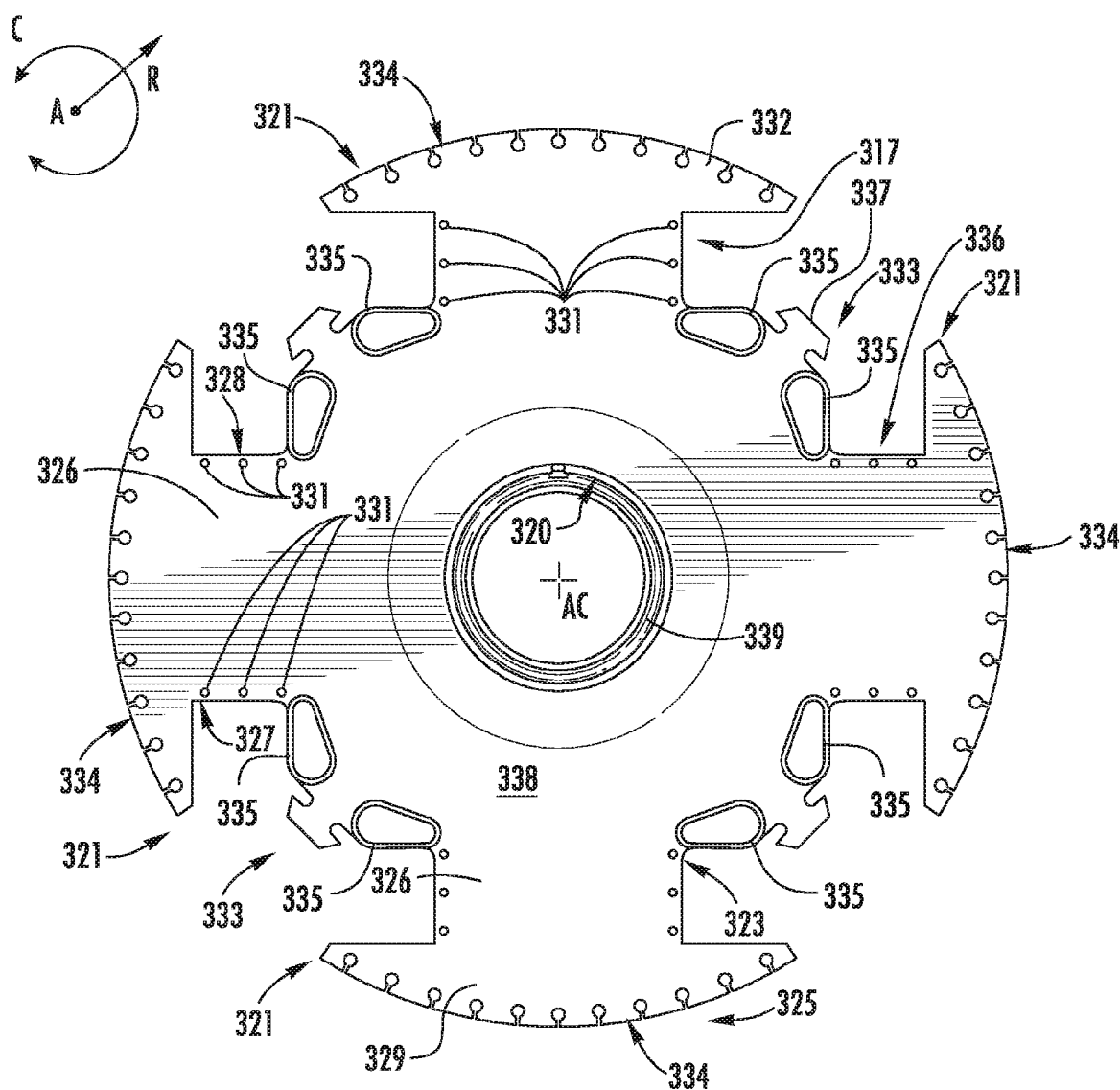
FIG. 3 depicts an example layer of a rotor core according to example embodiments of the present disclosure.

FIG. 3 depicts an example layer 332 of a rotor core printed according to example aspects of the present disclosure. As shown, the layer 332 of the rotor core defines an axial direction A, a radial direction R, and a circumferential direction C extending three hundred sixty degrees (360°) about the axial direction A. In FIG. 3, the axial direction A extends into and out of the page. The layer 332 can be printed using, for instance, as an iron-cobalt-vanadium soft magnetic alloy (e.g. Hiperco50 Alloy).

As depicted in FIG. 3, for this example embodiment, the layer 332 is printed such that a plurality of poles 321 project from a core body 338 of the rotor core 330 (FIG. 2). More particularly, each of the poles 321 projects outward from the core body 338 along the radial direction R with respect to an axial centerline AC centered on the rotor shaft 320. Each pole 321 extends between a first end 323 and a second end 325, e.g., along the radial direction R. The first ends 323 of the poles 321 connect the respective poles 321 with the core body 338 and the second ends 325 form the outer periphery of the layer 332. Each pole 321 has a pole body 326 and a pole shoe 329. Each of the pole bodies 326 extend from the first ends 323 of their respective poles 321 to their respective pole shoes 329. The pole shoes 329 project outward from their respective pole bodies 326, e.g., along the radial direction R. Each pole shoe 329 has an outer or peripheral surface 334. Each pole body 326 extends between a first wall 327 and a second wall 328 to define a pole body width.

Figure 5:
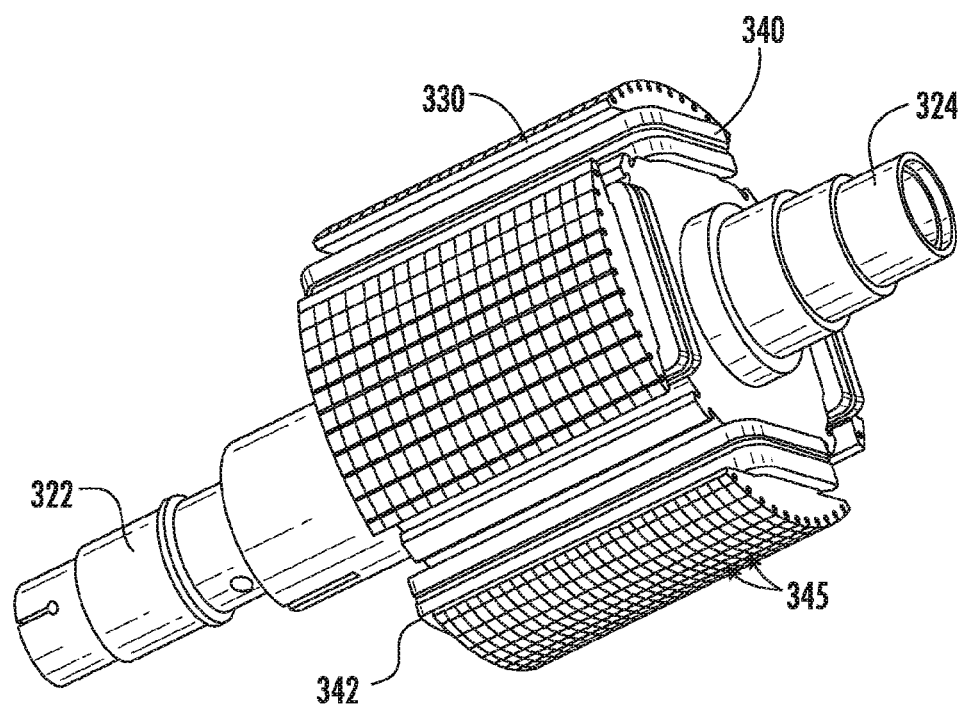
FIG. 5 depicts an example result of auto winding a winding to the rotor core according to example embodiments of the present disclosure.

A rotor slot 333 is defined between each of the plurality of poles 321. Each rotor slot 333 has a first winding slot 336 and a second winding slot 317 spaced from the first winding slot 336, e.g., along the circumferential direction C. The first winding slots 336 and second winding slots 317 of each rotor slot 333 are configured to receive a winding of a rotor winding 340, e.g., as shown in FIG. 5. Moreover, a retaining member 337 projects from the core body 338 between the first and second winding slots 336, 317. The retaining members 337 facilitate retention of the windings of the rotor winding 340 (FIG. 5).

As further depicted in FIG. 3, cooling tubes 335 can be printed in each layer of the rotor core. The cooling tubes 335 can be printed of the same material as the layer 332. For instance, the cooling tubes 335 can be printed as an iron-cobalt-vanadium soft magnetic alloy (e.g. Hiperco50 Alloy). For the depicted embodiment of FIG. 3, the cooling tubes 335 are printed such that they each have a teardrop cross section as viewed from the perspective of FIG. 3, e.g., an axial view. Moreover, notably, the cooling tubes 335 are printed proximate rotor slots 333 defined between adjacent rotor poles 321. In this way, the fluid flow through the cooling tubes 335 may facilitate cooling of the windings (not shown in FIG. 3) when they are inserted in the rotor slots 333. Further, in some embodiments, a portion of the rotor shaft 320 can also be printed along with the rotor core. The portion of the rotor shaft 320 can be printed using the same or a different material than the rotor core. In some embodiments, the rotor core and the rotor shaft are formed of the same material composition (e.g., a first material composition).

As further shown in FIG. 3, the layer 332 and thus the rotor core is printed such that the rotor core defines one or more cooling openings 331 that extend, e.g., along the axial direction A. More particularly, the one or more cooling openings 331 can be printed such that they are defined by the pole body 326 of at least one of the plurality of poles 321, e.g., along the axial direction A. In this example embodiment, the cooling openings 331 are printed such that they are defined by the pole body 326 proximate at least one of the first wall 327 and the second wall 328 of the pole body 326. More particularly, in this example embodiment, the cooling openings 331 are printed such that they are defined by the pole body 326 of each of the plurality of poles 321 proximate the first wall 327 and proximate the second wall 328 of each of the pole bodies 326. Stated differently, as shown in FIG. 3, the cooling openings 331 are printed such that they are defined along the first wall 327 and the second wall 328 of the pole body 326 of each pole 321 of the layer 332 of the rotor core. The positioning of the cooling openings 331 provide additional cooling to the rotor core, particularly proximate the first wall 327 and the second wall 328 of the pole body 326 of each pole 321 of the rotor core. In alternative example embodiments, instead of printing the rotor core to define the cooling openings 331, the openings are formed after printing by electrical discharge machining (EDM). Further, in some example embodiments, the end layers that form the rotor core do not include cooling openings 331. However, in some example embodiments, the end layers of the rotor core do include cooling openings 331, e.g., as shown in FIG. 3. An example rotor core 330 printed according to example aspects noted above is depicted in FIG. 2.

Further, as shown particularly in FIG. 2, in some example embodiments, rotor core 330 is printed layer by layer by a 3D printing process in such a way that the peripheral surface 334 of each pole 321 defines a plurality of slots 345. As depicted in FIG. 2, the slots 345 may be defined by peripheral surface 334 such that the slots 345 extend between a first end 343 and a second end 348 of each pole shoe 329. The slots 345 are spaced from one another along the axial direction A and extend along a direction that is substantially orthogonal to the axial direction A. Further, for this example embodiment, as the peripheral surfaces 334 of each pole 321 are curved, the slots 345 extend generally along the circumferential direction C. However, in alternative embodiments in which the peripheral surfaces 334 are not curved, the slots 345 follow the general contour of the peripheral surfaces 334 of the poles 321. In preferred embodiments, the slots 345 have a depth of between about a quarter inch (¼ inch) to about a half inch (½ inch). Advantageously, the slots 345 reduce eddy current losses and reduce the sink effect during operation of an electrical machine for which the rotor core 330 is utilized. In alternative example embodiments, instead of printing the slots 345 as part of the rotor core, the slots 345 are formed after printing by electrical discharge machining (EDM).

Figure 4:
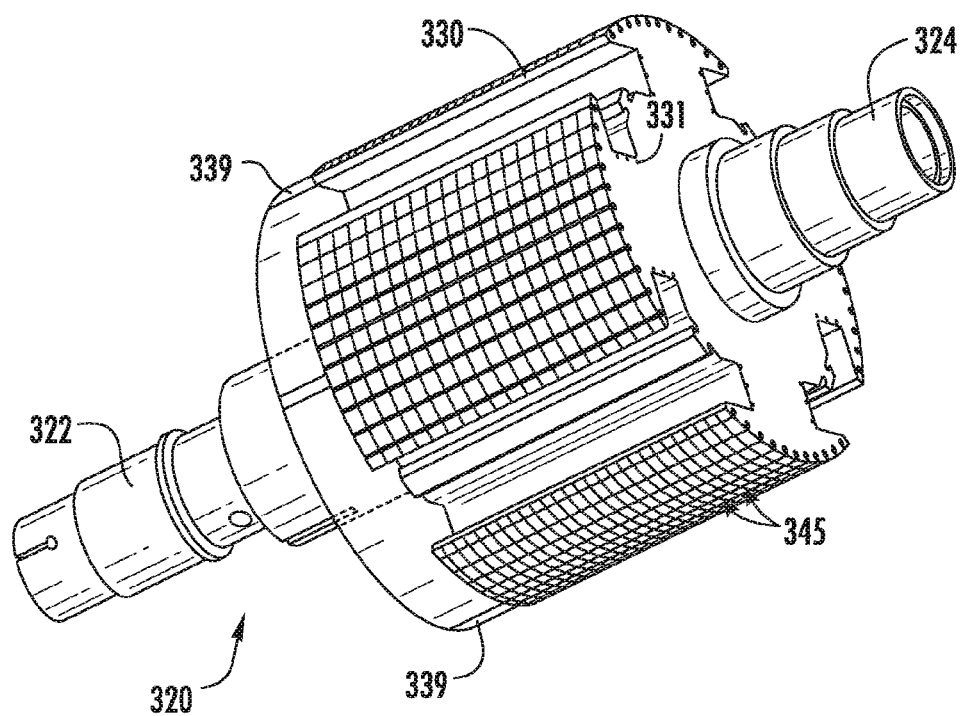
FIG. 4 depicts a rotor core printed according to example embodiments of the present disclosure.

At (306), once the rotor core 330 is finished, the method (300) can include printing a second or bottom portion of the rotor shaft layer by layer until it reaches a desired height. FIG. 4 depicts an example second portion 324 of the rotor shaft 320 printed according to example embodiments of the present disclosure. The second portion 324 of the rotor shaft 320 can be printed of any suitable material. For example, in some embodiments, the second portion 324 of the rotor shaft 320 can be printed of a steel alloy, such as a #4340 steel alloy containing, for instance, nickel, chromium, and molybdenum. Other suitable materials can be used without deviating from the scope of the present disclosure.

Figure 7:
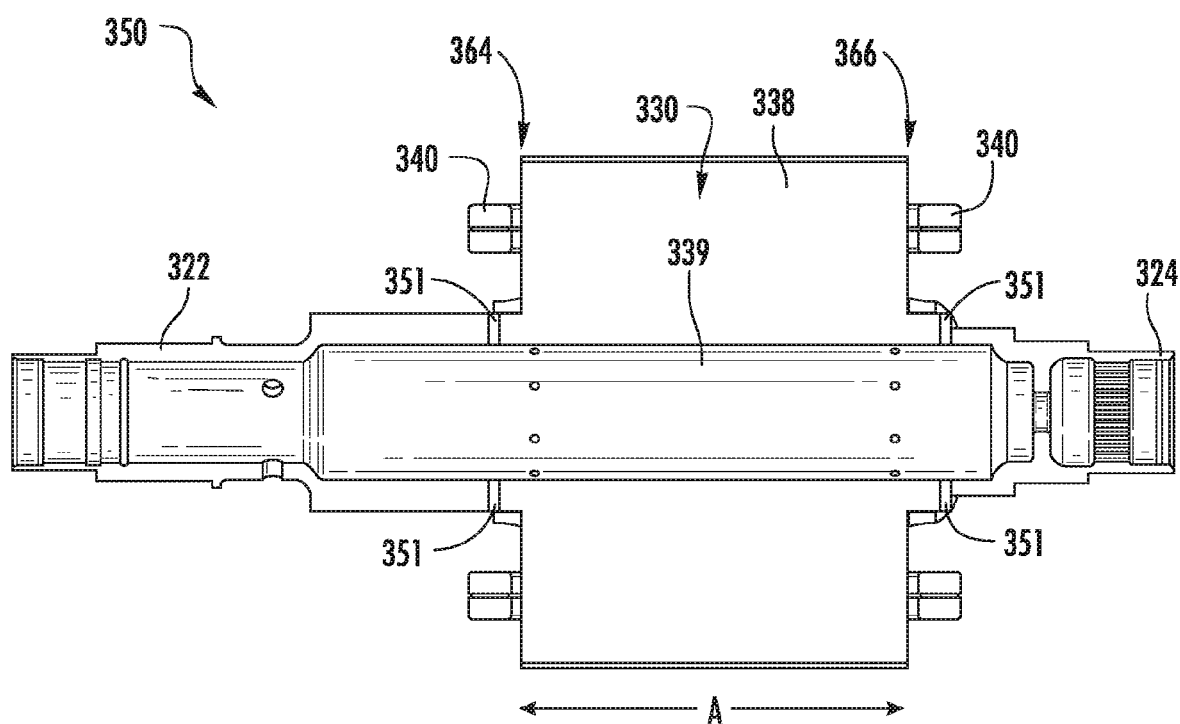
FIG. 7 depicts a cross-sectional view of a rotor core printed according to example embodiments of the present disclosure.

As further depicted in FIGS. 3 and 7, a core portion 339 of the rotor shaft 320 is unitarily formed with the core body 338 when the rotor core 330 is printed. As shown, the core portion 339 is disposed radially inward of the core body 338. The core portion 339 of the rotor shaft 320 extends between a first end 364 and a second end 366 of the rotor core 330, e.g., along the axial direction A as shown in FIG. 7. The second part 324 of the rotor shaft 320 is connected to the core portion 339 of the rotor shaft 320 at the second end 366 of the rotor core 330 and the first part 322 of the rotor shaft 320 is connected to the core portion 339 of the rotor shaft 320 at the first end 364 of the rotor core 330.

In some example embodiments, with reference to FIG. 4, the rotor core 330, the first portion 322 of the rotor shaft 320, and the second portion 324 of the rotor shaft 320 are printed using the same material composition. In this way, the rotor core 330 and rotor shaft 320 are formed of a homogenous material. For instance, the rotor core 330, the first portion 322 of the rotor shaft 320, and the second portion 324 of the rotor shaft 320 may each be printed using an iron-cobalt-vanadium soft magnetic alloy. Other suitable material compositions are possible.

Further, in some example embodiments, e.g., as noted above, the rotor core 330, the first portion 322 of the rotor shaft 320, and the second portion 324 of the rotor shaft 320 are additively printed, and as such, the rotor core 330, the first portion 322 of the rotor shaft 320, and the second portion 324 of the rotor shaft 320 are integrally formed as a single unitary component. In some alternative embodiments, however, the rotor core 330 and at least one of the first portion 322 and the second portion 324 of the rotor shaft 320 are integrally formed as a single unitary component. Stated differently, in such example embodiments, the rotor core 330 and one of the portions 322 or 324 are integrally formed as a single unitary component; both portions 322, 324 need not be integrally formed with the rotor core 330 as a single unitary component.

At (308), referring again to FIG. 1, the method (300) includes coating an insulation material on the surfaces of the rotor poles 321. For instance, the peripheral surfaces 334 of the poles 321 may be coated with an insulation material. Other surfaces of the poles 321 may be coated with insulation as well. For instance, the first wall 327 and second wall 328 of each pole 321 may be coated with insulation as well. Coating the various surfaces of the poles 321 with insulation provides ground insulation for the rotor assembly 350.

At (310), once the surfaces of the rotor poles are coated with insulation at (308), the method (300) includes autowinding the rotor winding onto the rotor core. For instance, as shown in FIG. 5, the results of an autowinding process are depicted. In particular, as shown, the rotor winding 340 is shown coupled with the rotor core 330 via an autowinding machine. The rotor winding 340 may be auto winded onto the rotor core 330 because features such as e.g., cooling tubes 335 and cooling openings 331, are printed as part of the rotor core 330.

Figure 6:
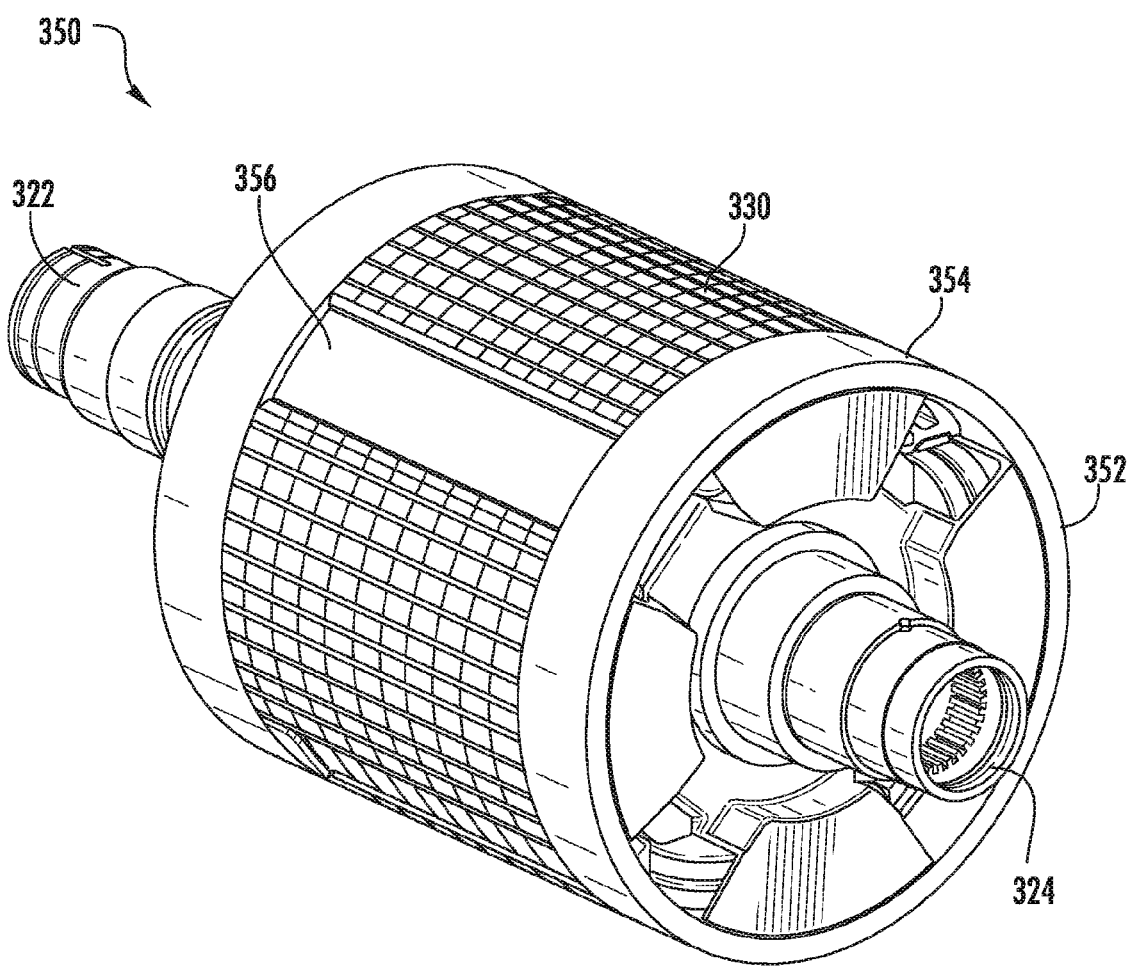
FIG. 6 depicts a rotor assembly printed according to example embodiments of the present disclosure.

At (312), with reference again to FIG. 1, in some implementations, the method (300) includes applying a varnish or epoxy to the rotor assembly. For instance, the rotor assembly can be varnished using a varnish or an epoxy. Alternatively or additionally, the epoxy can be potted. Still further, the varnish or epoxy can be electrophoretically deposited onto the rotor assembly. In some embodiments, as shown in FIG. 6, accessories such as end caps 352, retaining rings 354, and/or cooling components 356 can be assembled to the rotor core 330 to complete the rotor assembly 350. Variations and modifications can be made to the rotor assembly 350 without deviating from the scope of the present disclosure. For instance, as shown in FIG. 7, wet cavity oil spray nozzles 351 can be printed as part of the rotor core 330 for use in wet cavity electrical machines.

Figure 8:
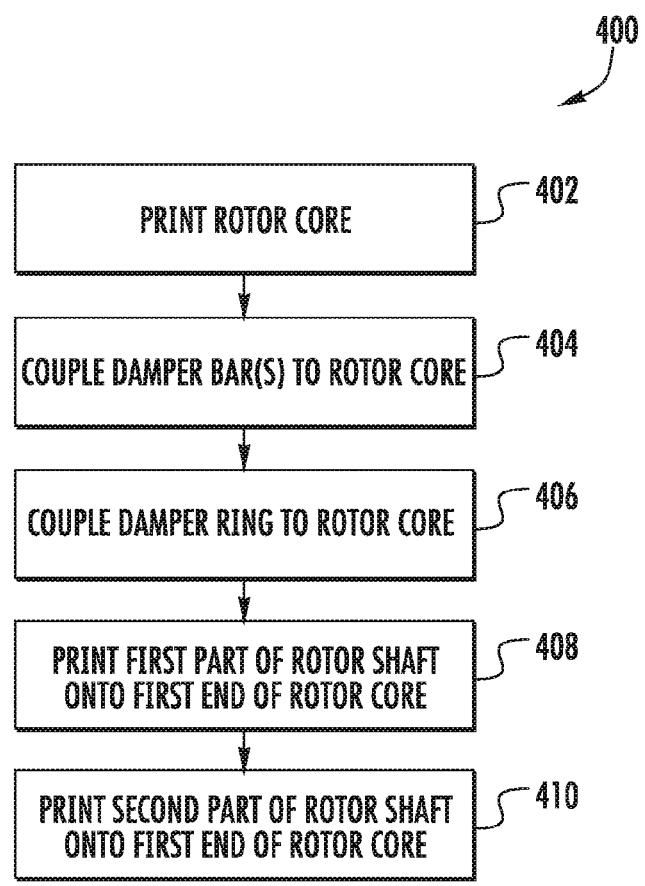
FIG. 8 depicts a flow diagram of an example method for manufacturing a rotor assembly according to example embodiments of the present disclosure.

FIG. 8 depicts another example method (400) for manufacturing a rotor assembly for an electrical machine. Method (400) is discussed below as being performed in a particular order for purposes of illustration and discussion. Those of ordinary skill in the art, using the disclosures provided herein, will understand that the steps of any of the methods disclosed herein can be adapted, expanded, include substeps, modified, omitted, performed simultaneously, and/or rearranged in various ways without deviating from the scope of the present disclosure.

At (402), the method (400) can include printing a rotor core 360. The rotor core 360 can be printed of any suitable material. For instance, the rotor core 360 can be printed using an iron-cobalt-vanadium soft magnetic alloy (e.g. Hiperco50 Alloy).

Figure 9:
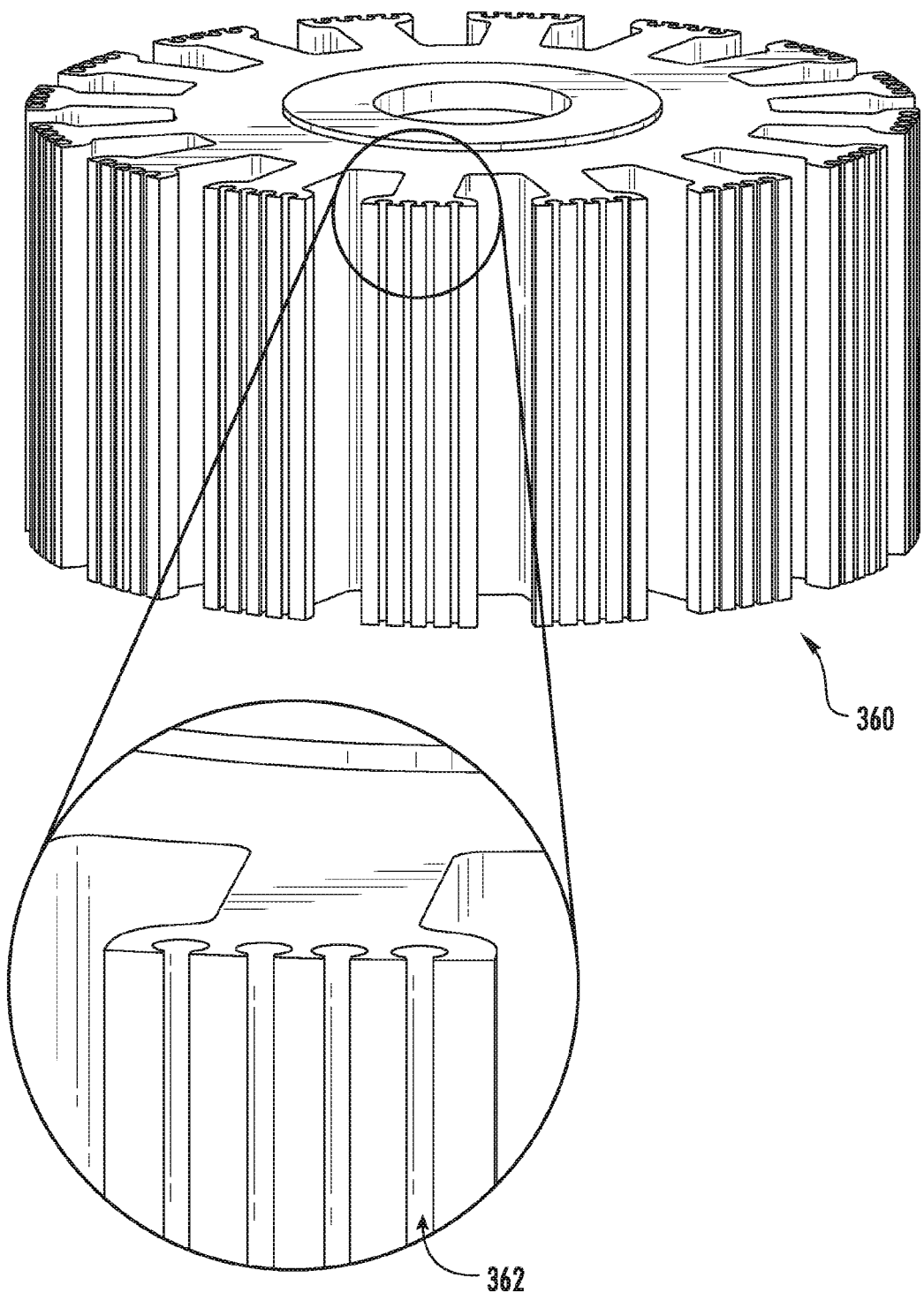
FIG. 9 depicts a rotor core printed according to example embodiments of the present disclosure.
Figure 10:
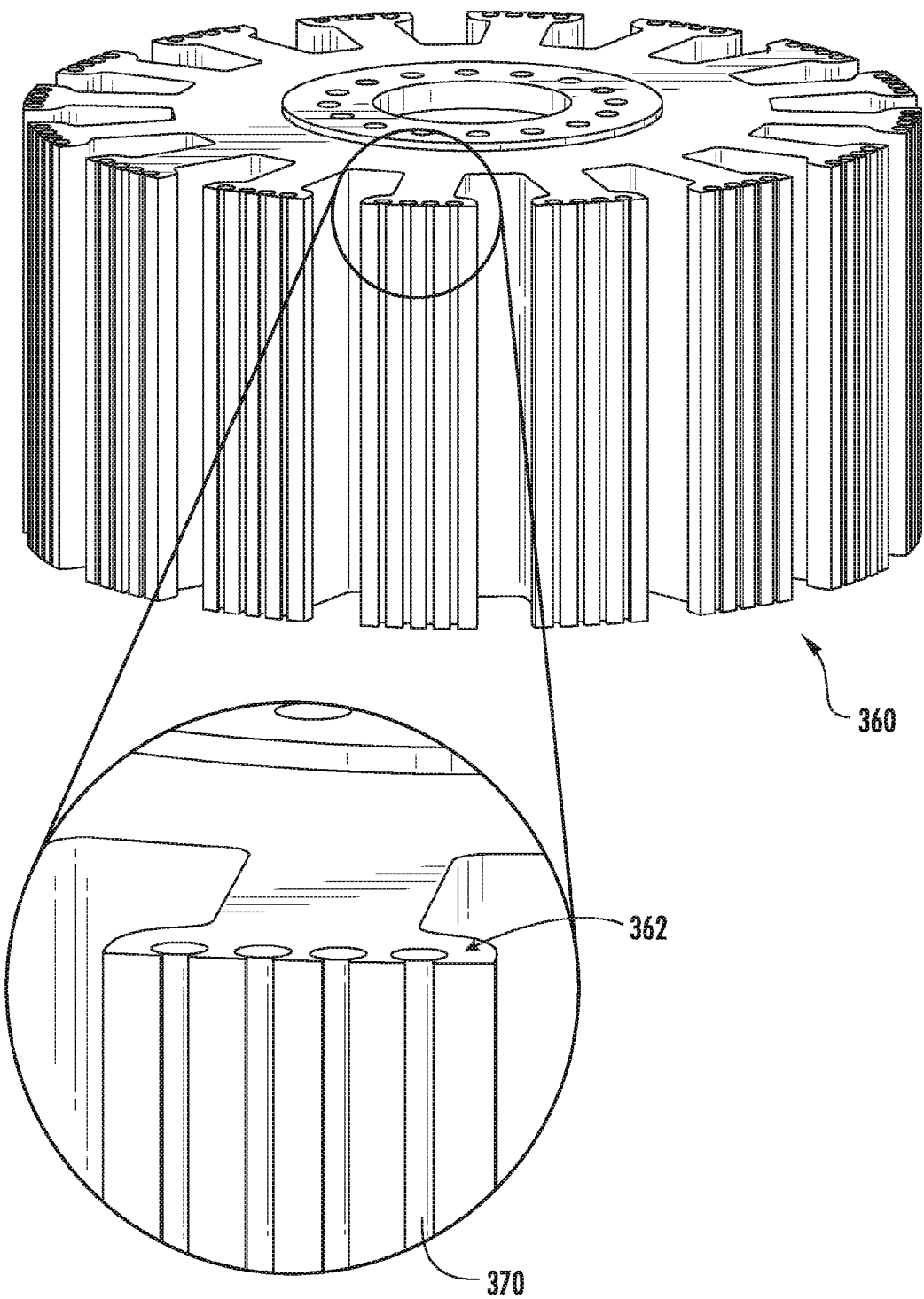
FIG. 10 depicts a plurality of damper bars coupled to a rotor core according to example embodiments of the present disclosure.

At (404), the method (400) can include coupling at least one damper bar to the rotor core. The at least one damper bar can be formed of any suitable material. In some implementations, a plurality of damper bars may be coupled to the rotor core. As shown in FIGS. 9 and 10, in some example embodiments, coupling the at least one damper bar 370 to the rotor core 330 includes inserting the damper bar 370 into one of a plurality of damping slots 362 defined by the rotor core 360. As shown in FIG. 9, the damping slots 362 are defined by rotor core 360 at an outer periphery of the poles of the rotor core 360. As shown in FIG. 10, the damper bars 370 are shown inserted into respective damping slots 362.

Figure 11:
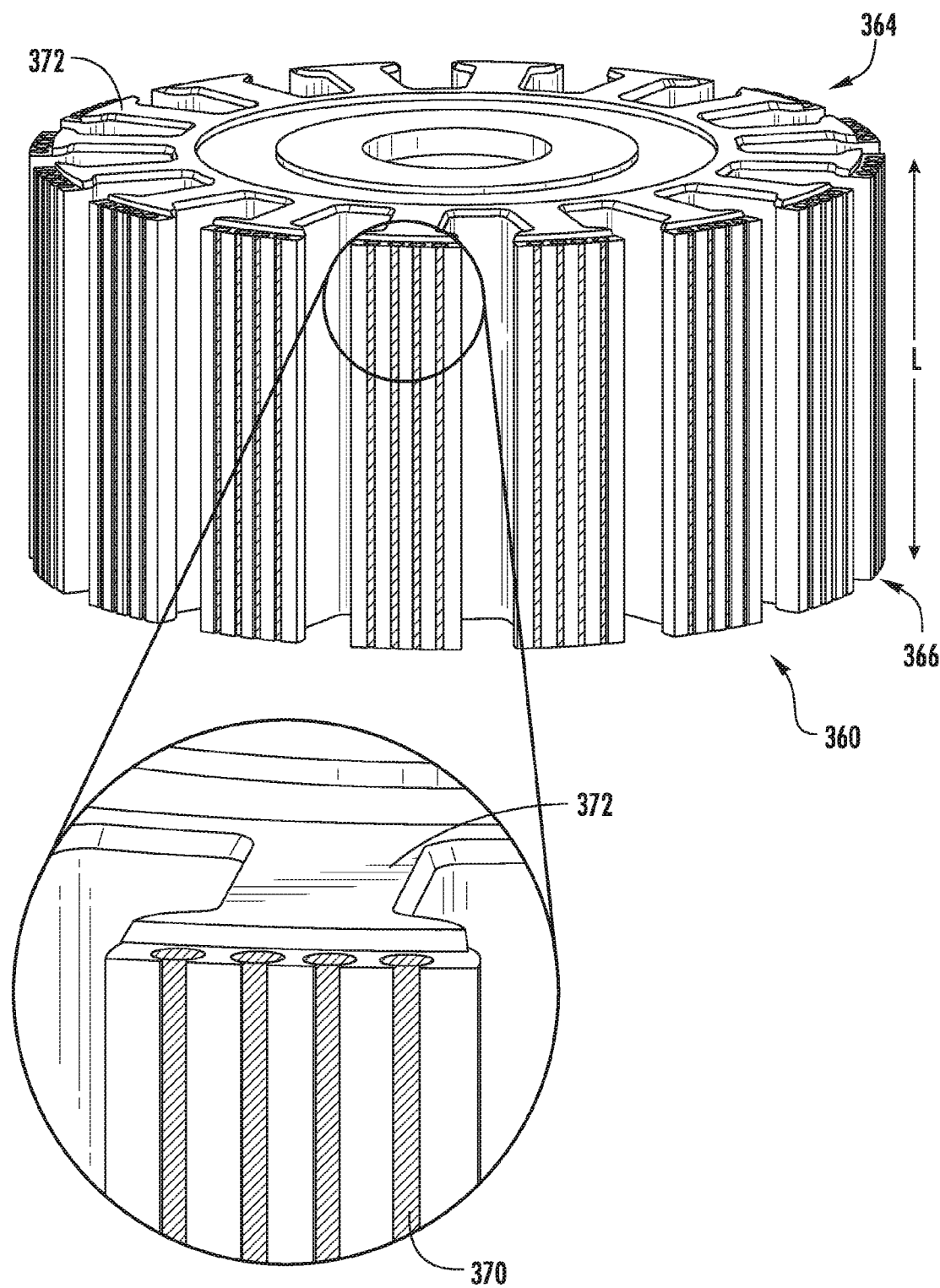
FIG. 11 depicts a damper ring coupled to the rotor core of FIG. 10 according to example embodiments of the present disclosure.

At (406), the method (400) can include coupling a damper ring 372 to the rotor core 360. In example embodiments, the damper ring 372 can be positioned on a first end 364 of the rotor core 360, e.g., as shown in FIG. 11. In alternative embodiments, however, the damper ring 372 can be positioned on a second end 366 of the rotor core 360. In particular, the second end 366 can be spaced apart from the first end 364 along a length L of the rotor core 360.

Figure 12:
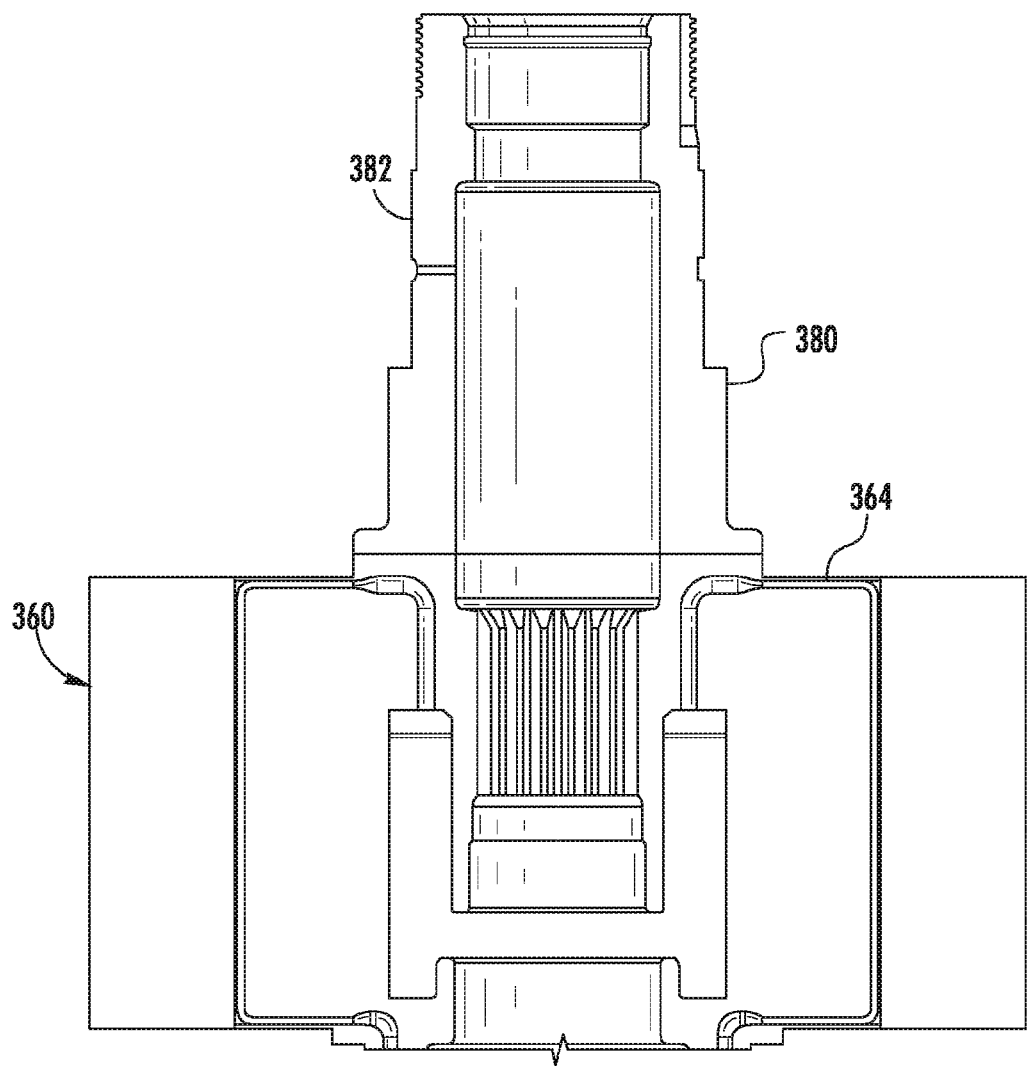
FIG. 12 depicts a first part of a rotor shaft printed onto a rotor core according to example embodiments of the present disclosure.

At (408), the method (400) can include printing a first part 382 of a rotor shaft 380 onto the first end 364 of the rotor core 360, e.g., as shown in FIG. 12.

Figure 13:
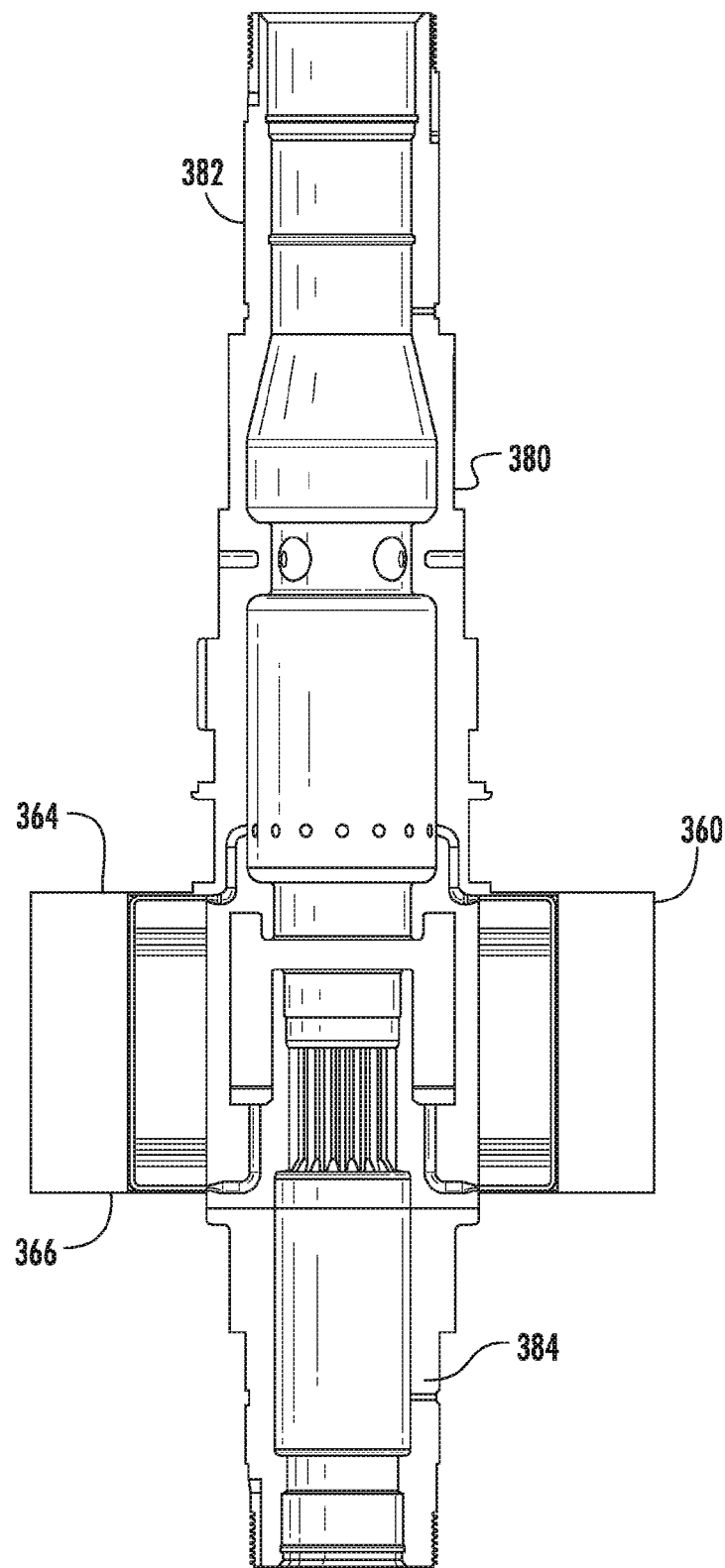
FIG. 13 depicts a second part of a rotor shaft printed onto a rotor core according to example embodiments of the present disclosure.

At (414), the method (400) can include printing a second part 384 of the rotor shaft 380 onto the second end 366 of the rotor core 360 to form the rotor assembly, e.g., as shown in FIG. 13.

Figure 14:
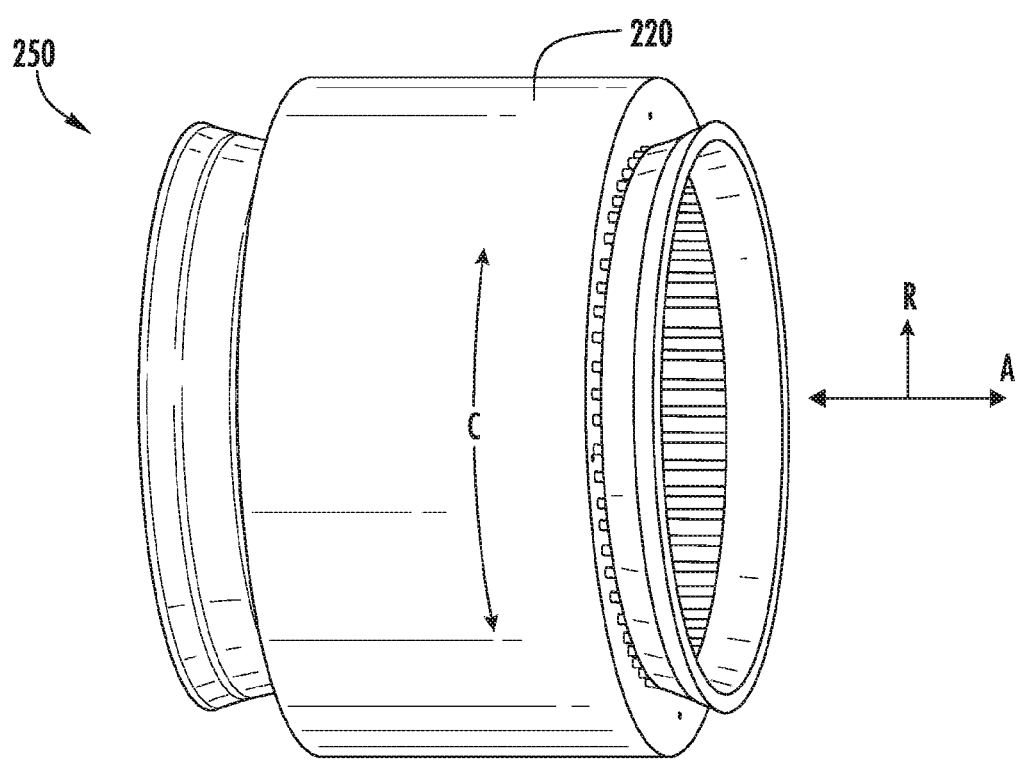
FIG. 14 depicts an example stator assembly according to example embodiments of the present disclosure.

FIG. 14 provides an example stator assembly 250 that may be utilized with any of the example rotor assemblies described above to form an electrical machine. As shown, stator assembly 250 defines an axial direction A, a radial direction R, and a circumferential direction C extending three hundred sixty degrees (360°) about the axial direction A. The stator assembly 250 includes a stator core 220. The stator core 220 has a generally cylindrically shape. For this example, the stator core 220 is printed utilizing a 3D printing process as a solid stator core. Accordingly, the solid stator core 220 is formed as a single, continuous, unitary component.

Figure 15:
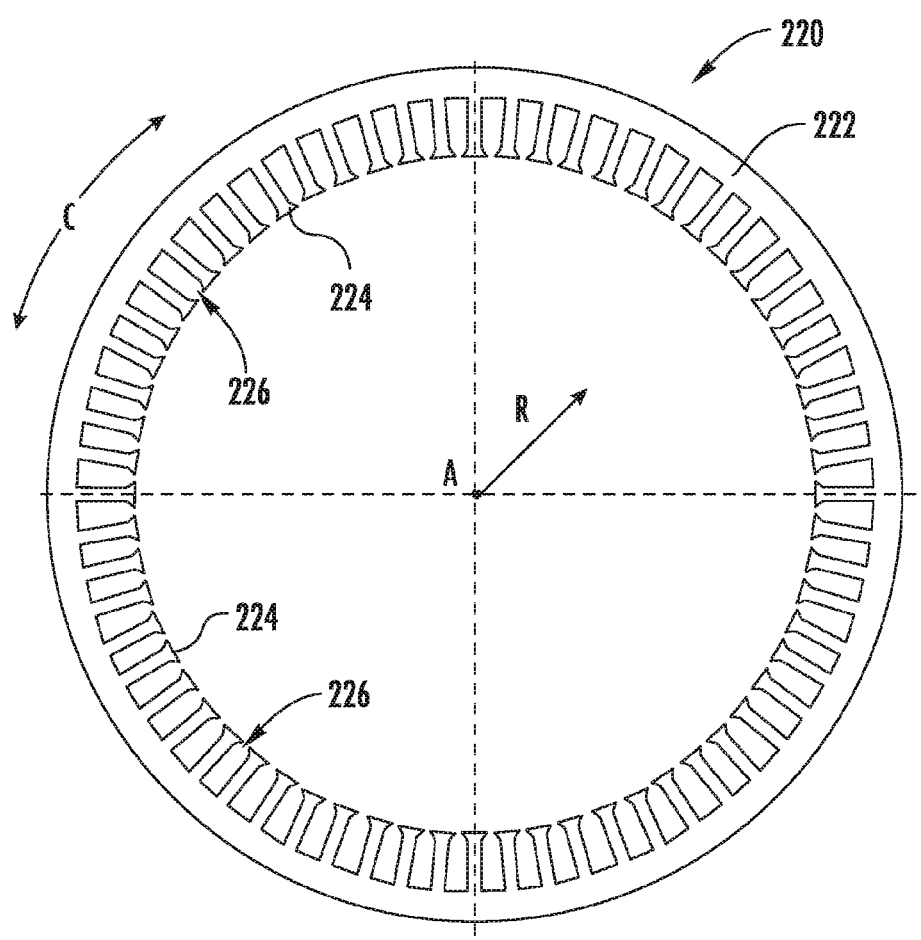
FIG. 15 depicts a cross section of an example stator core of the stator assembly of FIG. 14.

FIG. 15 provides an axial cross sectional view of the stator core 220 of the stator assembly 250 (the other components of the stator assembly 250 have been removed in FIG. 15). As shown, the stator core 220 includes a core body 222 and a plurality of poles 224 or teeth projecting from the core body 222. For this example, the poles 224 project radially from the core body 222, and more particularly, the poles 224 project radially inward from the core body 222. The core body 222 may be a back iron, for example. Slots 226 are defined between each of the poles 224.

Figure 16:
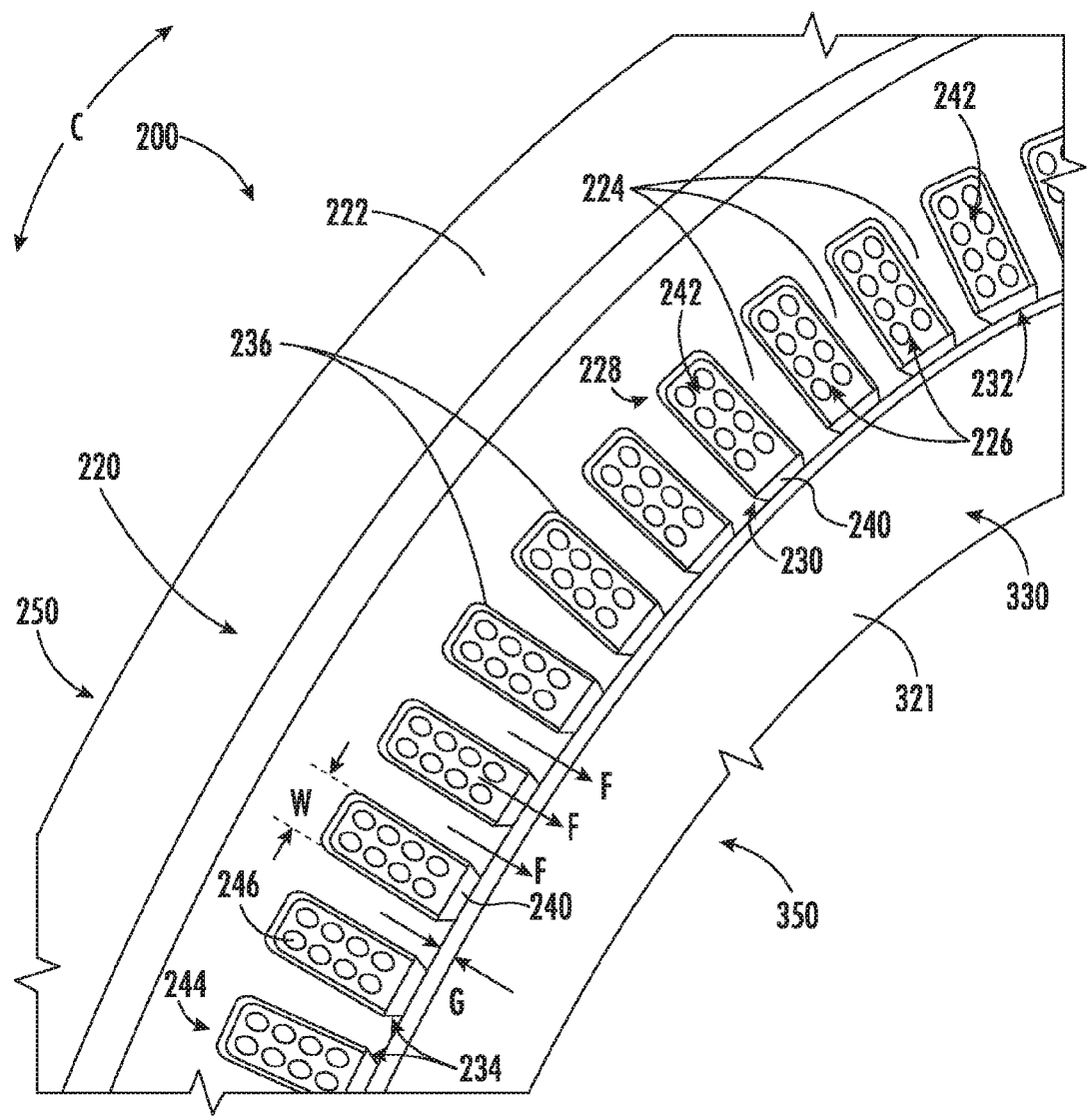
FIG. 16 depicts a close up view of an example electrical machine according to example embodiments of the present disclosure.

FIG. 16 depicts a close up, cross sectional view of an electrical machine 200 that includes the stator assembly 250 and rotor assembly 350. As shown, each of the poles 224 of the stator core 220 has a first end 228 integrally formed with the core body 222 and an opposing second end 230. In some embodiments, the first end 228 of each pole 224 may be connected to or otherwise attached to the core body 222. Each slot 226 defined between adjacent poles 224 has a mouth 232 adjacent the second ends 230 of adjacent poles 224 and a slot width W defined between opposing side walls of adjacent poles 224. Each pole 224 includes tips 234 projecting outward at the second end 230 of each pole 224, e.g., along the circumferential direction C. A slot liner 236 insulates the perimeter of each of the slots 226. In some embodiments, the slots 226 may be skewed.

As further shown in FIG. 16, stator assembly 250 includes a plurality of slot wedges 240 formed of a magnetic material. The slot wedges 240 may be formed of any suitable magnetic material. For example, in some embodiments, the slot wedges 240 are formed of a powdered iron mixed with an epoxy. As shown, the slot wedges 240 are disposed between the tips 234 of adjacent poles 224 at their second ends 230. More particularly, each of the plurality of slot wedges 240 are disposed between the tips 234 of adjacent poles of the plurality of poles 224 within their corresponding slots 226 and span the slot width W of their respective slots 226. A space 242 is defined between each slot wedge 240 and the core body 222. A winding assembly 244 that includes a plurality of windings 246 made up of coils of several turns are inserted into the spaces 242 of the slots 226. The slot wedges 240 hold the windings 246 securely within the slots 226. An air gap G is defined between the stator assembly 250 and the poles 321 of the rotor core 330. Further, for this example, the rotor core 330 is printed layer by layer by a 3D printing process to form a solid core. That is, the rotor core 330 is formed of as a unitary component as opposed to, e.g., a core formed of laminations.

Advantageously, during operation of the electrical machine 200 that includes stator assembly 250 and rotor assembly 350, the magnetic slot wedges 240 minimizes or reduces the tooth harmonics (also known as slot harmonics), e.g., compared to conventional slot wedges formed of insulating material. Generally, tooth harmonics are caused due to variation in the reluctance across the air gap G. Tooth harmonics are generally undesirable as they cause unwanted torque, vibration, and noise. The magnetic slot wedges 240 of the stator assembly 250 prevent tooth harmonics flux from crossing the air gap G. Thus, the dominated magnetic flux that crosses the air gap G is a sinusoidal distributed flux that travels at the same rotating speed or about the same rotating speed in the air gap G as the speed of the rotor core 330 speed. As shown by the arrows labeled as F in FIG. 16, flux F crosses the air gap G radially inward along the radial length of each pole 224. As the slot wedges 240 are magnetic, flux F also crosses the air gap G through the radial thickness of each slot wedge 240. In this way, a more uniform flux crossing the air gap G is achieved. As the change in flux across the air gap G is reduced, induced current in the rotor core 330 is reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor assembly for an electrical machine, the method comprising:
    printing, by a three-dimensional (3D) printing process, a first part of a rotor shaft;
    printing, by the 3D printing process, a rotor core extending between a first end and a second end and having a core body and a core portion of the rotor shaft formed unitarily with the core body, the core portion of the rotor shaft extending between the first end and the second end of the rotor core, wherein the rotor core is printed as a solid core;
    printing, by the 3D printing process, a second part of the rotor shaft, wherein the second part of the rotor shaft is connected to the core portion of the rotor shaft at the second end of the rotor core and the first part of the rotor shaft is connected to the core portion of the rotor shaft at the first end of the rotor core; and
    coupling a rotor winding to the rotor core to form the rotor assembly.

2. The method of claim 1, wherein the rotor core, the first part of the rotor shaft, and the second part of the rotor shaft are printed using a first material composition and are formed as a unitary component.

3. The method of claim 1, wherein a plurality of poles project from the core body, and wherein coupling the rotor winding to the rotor core to form the rotor assembly comprises autowinding the rotor winding to the rotor core, and wherein prior to autowinding, the method further comprises:
    coating a surface of the plurality of poles with an insulation material.

4. The method of claim 1, wherein the rotor core comprises a plurality of poles projecting from the core body.

5. The method of claim 4, wherein each one of the plurality of poles comprises a pole body, and wherein the rotor core is printed such that a plurality of cooling openings are defined by the pole body of at least one of the plurality of poles.

6. The method of claim 4, wherein each one of the plurality of poles comprises a pole body extending between a first wall and a second wall, and wherein the rotor core is printed such that a plurality of cooling openings are defined by the pole body of one or more of the plurality of poles, wherein at least one of the plurality of cooling openings is defined adjacent the first wall of the pole body and at least one of the plurality of cooling openings is defined adjacent the second wall of the pole body.

7. The method of claim 4, wherein the plurality of poles each comprise a peripheral surface, and wherein the method further comprises:
    machining, via wire electrical discharge machining, a plurality of slots in the peripheral surface of at least one of the plurality of poles.

8. The method of claim 4, wherein the rotor assembly defines an axial direction, and wherein the plurality of poles each comprise a peripheral surface, and wherein the rotor core is printed such that a plurality of slots are defined extending in a direction substantially orthogonal to the axial direction in the peripheral surface of at least one of the plurality of poles.

* * * * *